(12) United States Patent
Thorson et al.

(10) Patent No.: US 7,295,727 B1
(45) Date of Patent: Nov. 13, 2007

(54) MOUNTED MEMS OPTICAL DIAGNOSTIC SWITCH

(75) Inventors: Kevin J. Thorson, Eagan, MN (US); Charles J. Kryzak, Mendota Heights, MN (US); Brian S. Leininger, Woodbury, MN (US); Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/119,621

(22) Filed: May 2, 2005

(51) Int. Cl.
*G02B 6/35* (2006.01)

(52) U.S. Cl. .......................... 385/18; 385/19

(58) Field of Classification Search ................ None
See application file for complete search history.

(56) References Cited

U.S. PATENT DOCUMENTS

| | | | |
|---|---|---|---|
| 5,923,798 A | 7/1999 | Aksyuk et al. | |
| 5,990,473 A | 11/1999 | Dickey et al. | |
| 6,205,267 B1 | 3/2001 | Aksyuk et al. | |
| 6,253,001 B1 | 6/2001 | Hoen | |
| 6,453,083 B1 * | 9/2002 | Husain et al. ............... | 385/17 |
| 6,594,058 B2 * | 7/2003 | Flanders .................... | 359/227 |
| 6,690,847 B2 | 2/2004 | Hsu | |
| 6,694,071 B2 | 2/2004 | Hsu | |
| 6,798,992 B1 * | 9/2004 | Bishop et al. ............... | 398/45 |
| 6,813,407 B2 | 11/2004 | Ramaswami et al. | |
| 6,842,556 B2 | 1/2005 | Reznichenko | |
| 2005/0013534 A1 * | 1/2005 | Kazama et al. ............. | 385/18 |

OTHER PUBLICATIONS

Smith et al., "Embedded Micromechanical Devices for the monolithic Integration of MEMS with CMOS", Proc. 1995 IEDM, pp. 609-612.

* cited by examiner

*Primary Examiner*—Michelle Connelly-Cushwa
*Assistant Examiner*—Jerry T. Rahll
(74) *Attorney, Agent, or Firm*—Brooks, Cameron & Huebsch, PLLC (57) ABSTRACT

A parallel mounted MEMs optical diagnostic switch disposed within an optical connector for directing optical signals from one or a plurality of light sources to one or a plurality of light collectors by activating a feedback loop through the use of micro electro mechanical systems (MEMS). The present invention includes one or more mirrors mounted parallel to the path of optical transmission through the tool. The mirrors and can be automatically activated at power up or selectively thereafter for detecting faults in any upstream fiber optic component. When in the passive mode, the present invention retracts away from the optical path so as not to interfere with normal system operations.

21 Claims, 7 Drawing Sheets

MOUNTED MEMS OPTICAL DIAGNOSTIC SWITCH

FIELD OF THE INVENTION

This invention generally relates to the art of fiber optic communications and particularly to a system to improve the health and maintenance of optical signal transmissions through fiber optic pathways by inserting a parallel mounted MEMs optical diagnostic switch between conventional MT connectors for selectively creating a feedback loop to diagnose the condition of each optoelectronic module or the condition of the fiber optic path.

BACKGROUND OF THE INVENTION

Fiber optic transmission systems typically utilize an optoelectronic source such as a LED or a vertical cavity surface emitting laser (VCSEL) to generate optical signals for communication purposes. The optical signals are transmitted along optical glass fibers to a receiver diode or similar communications device where the optical signals are converted to electrical signals. For competitive reasons, optical networks support an ever increasing menu of products which require high bandwidth and very high fiber count cables. Such systems require an efficient and economical method for diagnosing problems among the individual optical lines and the optoelectronic devices.

A number of factors impact the efficiency of an optical communication system including the quality of the optical signal produced by the optoelectronic device and the construction and alignment of the optical path. The optical device ports must be aligned with the optical fibers and optical fibers must be properly aligned with connectors and transceiver packages. The alignment issue is exacerbated by the tendency to package the optoelectronic devices into an array which transmits multiple signal lines simultaneously. Consequently, each optoelectronic device is operatively connected to an optical path, all of which are disposed within cables and connectors designed to use the minimum amount of space.

An important element in the optical path is the mechanically transferable ("MT") connector that is molded from composite plastics and has a standard dimension that can accommodate a plurality of optical fibers typically arranged in a linear array. Alignment of the connector is provided by a pair of precisely sized metal guide pins that fit into accurately molded guide pinholes in the connector parts. Typically, v-shaped fiber guiding grooves are molded into the connector body for aligning each fiber with the fiber holes at the interface. For higher fiber counts, 2-D array MT connectors have been developed which allow for up to 60 fiber pairs without changing the dimensions of the typical MT connector ferrule. The grooves are aligned by layer and the layers are then stacked to achieve higher fiber count connectors.

Fiber optic connectors can fail due to manufacturing errors, environmental fractures and improper handling. Manufacturing errors include broken fibers inside the ferrule or damage to the fiber buffer. Fibers may break due to poor construction of the fiber itself. Air voids in the epoxy that holds the fiber in place may cause the fiber to break free. Thermal expansion of the epoxy may also break the fiber. Other manufacturing problems result from poor ferrule end face quality. If the end face is under or over polished, it may not mate properly with the fiber optic connector. Furthermore, the connector body itself is constructed of many different parts. If these parts are not aligned properly there may be poor signal quality due to the connections. Typically such damage is not discovered until the fiber is in place.

Failures can also occur due to dropouts created by extreme vibration or shock loads. When the ferrule end face is damaged by vibrations, the glass fiber may be scratched or damaged leading to high insertion and return losses. Fiber optic connectors can also fail due to improper cleaning during the assembly process or simply by mating together two connectors that are incompatible. In addition to failures of connections and cable length, the lasing or detecting device may be the cause of system failure. These devices are subject to failure due to environmental stress and wear-out.

There is a need to be able to determine whether an individual fiber optic connection or fiber optic strand is providing the required signal quality. Likewise, it would be advantageous to selectively monitor the performance of an optoelectronic device without disconnecting the array from the optical pathway. Such a system would eliminate the costly down time and testing costs required to diagnose each individual fiber and devices off-line. Furthermore, an in-line diagnostic tool would eliminate the danger of further damaging a system during the test procedure.

SUMMARY OF THE INVENTION

The present invention is a parallel mounted MEMs optical diagnostic switch disposed within an optical connection for evaluating optical signal quality. The tool consists of a lens array, which collimates the light exiting a fiber port of an optical connector, and directs the light through free space to an opposing lens aligned with fiber ports on an opposing optical connector. When activated, the present invention advances one or multiple mirrors, into the optical path so as create a feedback loop which redirects the optical signal to a corresponding receiving fiber distally provided with a diagnostic analyzer. It is envisioned that multiple mirror configurations could be used simultaneously to test multiple lines. The diagnostic analyzer may be the systems receiver diode component. A micro-electro-machined system (MEMS) substrate may provide microactuators for advancing the mirrors in and out of the optical path. The substrate fabrication is generally explained by *Embedded micromechanical devices for the monolithic integration of MEMS with CMOS*, J. Smith, S. Montague, J. Sniegowski, J. Murray, and P. McWhorter, Proc. IEDM 1995, pp. 609-612, 1995. This fabrication process allows for an integrated microelectronic control system and micromachined mirror drive system all on one chip. Upon completion of a diagnostic test the mirror retreats so the system can return to normal operation. This process may be repeated until all lines have been evaluated.

In a first embodiment, the present invention is an in-line optical diagnostic switch for evaluating the condition of an optical connection, an optical fiber, or an optoelectronic device. The in-line optical diagnostic switch may include a tool housing disposed between a male optical fiber connector and a female optical fiber connector. The tool housing may include at least one guide hole so as to align the diagnostic tool with the male optical fiber connector and the female optical fiber connector. A first lens array is disposed at a first end of the tool housing proximate the male optical fiber connector. The first lens array includes at least one lens per fiber optic line. A second lens array is disposed at a second end of the tool housing proximate the female optical fiber connector with at least one lens per fiber optic line. A mirror assembly is disposed between the first lens array and the second lens array. The mirror assembly includes a mirror substrate and a plurality of mirror slides disposed so as to engage the mirror substrate. The mirror substrate may be a MEM system that includes micro actuators for selectively activating the plurality of mirror slides. The mirror slides includes at least one mirror disposed on each mirror slide.

It is envisioned that a first mirror may be positioned to direct an incoming optical signal to a diagnostic receiver diode. It is also envisioned that a first mirror may direct the optical signal to a second mirror and to further redirect the optical signal to an optical line which leads to a receiver diode. A first mirror may also include a plurality of mirrors disposed in a line so as to redirect a plurality of incoming optical signals to a second mirror slide with a plurality of mirrors so as to further redirect the incoming optical signals to a plurality of optical lines which lead to a plurality of receiver diodes. It is envisioned that many mirror configurations could be used to direct the signal or signals to a diagnostic analyzer.

The present invention is further an economical and efficient method for diagnosing the condition of optical connections, optical fibers and optoelectronic devices. The method includes inserting a tool housing between a male optical fiber connector and a female optical fiber connector, wherein the tool housing includes a first lens array disposed at a first end of the tool housing proximate the male connector; a second lens array disposed at a second end of the tool housing proximate the female connector; and a mirror assembly disposed between the first lens array and the second lens array. The mirror assembly includes a mirror substrate and a plurality of mirror slides disposed so as to engage the mirror substrate. The method further includes selectively moving the plurality of mirror slides from a passive position into the optical path and then activating a light source so as to create the optical signal. The optical signal, transmitted on a first fiber optic line; is redirected relative to the first fiber optic line by the first mirror to a diagnostic analyzer or to one or more additional mirrors which direct the optical signal to a diagnostic analyzer.

In an alternate embodiment for optical communication systems utilizing stacked fiber lines, a single mirror array is advanced into the optical path to create a feedback loop. The mirror array would contain one large or multiple mirrors all with the same angle of incidence so as to direct the optical signal to a receiving unit or additional mirror or mirrors which would eventually direct the optical signals to a diagnostic analyzer. In this embodiment, multiple lines could be diagnosed simultaneously or in the alternative, individual lines could be fired and tested in sequence without moving the mirrors.

In another embodiment, the present invention orients the MEMs device parallel to the light source transmission. In this embodiment, the parallel mounted MEMs optical diagnostic switch eliminates the need for the throughbores as mirror placement is controlled within the lithographic capability at the submicron level. The MEMs substrate is disposed in a plane parallel to the light source transmission so that the mirrors are then activated into the light transmission. This embodiment is thus less dependent on the mechanical placement of the MEMs substrate therefore simplifying construction and improving yields.

The in-line fiber optic diagnostic tool can be used without the mechanical removal of any component of the optical network thus eliminating the danger that the test itself may damage alignment or components. The present invention creates a feedback loop within the existing fiber ribbon. The net result is that an in-line diagnostic capability is performed on power up or whenever requested by the system.

DETAILED DESCRIPTION OF THE INVENTION

In the following description of various example embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention is a switch that provides an in-line diagnostic tool for directing light from one or a plurality of light sources to one or a plurality of light collectors by activating a feedback loop through the use of micro electro mechanical systems (MEMS). The present invention can be automatically activated to an active mode at power up or selectively thereafter. When in the passive mode, the present invention retracts away from the optical path so as not to interfere with normal operations.

Figure 1:
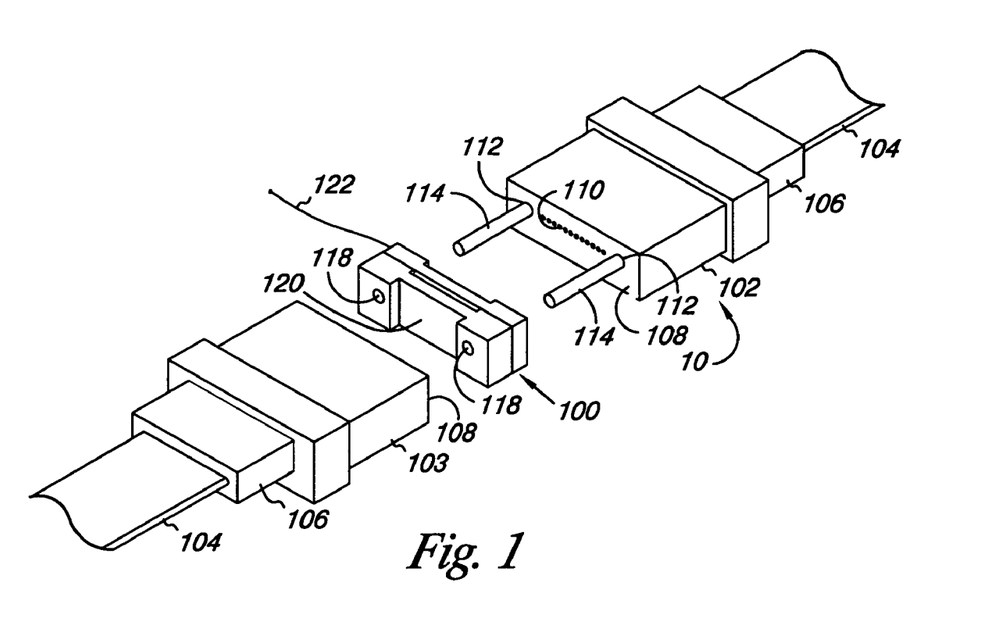
FIG. 1 is an exploded perspective view of the present invention disposed between two MT connectors.

As illustrated in FIG. 1, the in-line diagnostic tool 100 of the present invention is preferably disposed between a MT connector unit 10 comprised of a male MT connectors 102 and female MT connector 103. A fiber ribbon 104 containing the individual optical fibers is inserted into a boot 106 for integration with an MT connector 10. Both the male MT connector 102 and the female MT connector 103 have a mating face 108 on which are disposed a plurality of fiber ports 110 corresponding to the number of individual fibers contained in ribbon 104. The MT connector 10 in FIG. 1 includes 12-lines. MT connector 10 in alternate embodiments may contain a variety of layouts including designs with sixty lines in five stacks of twelve. The in-line diagnostic tool 100 can be formatted to handle any combination of single or stacked line layouts. Also disposed on mating face 108 is a pair of precisely aligned guide holes 112 from which one male MT connector 102 guide pins 114 extend.

Alignment of in-line fiber optic diagnostic tool 100 is accomplished by inserting guide pins 114 through alignment holes 118 and on into the mating guide holes 146 in the female MT connector 103. Once aligned, the fiber lines 110 of the male MT connector 102 align with the internal optical pathway of in-line fiber optic diagnostic tool 100. The fiber ports 110 on the female MT connector 103 align with the output lens array 120 of the in-line diagnostic tool 100.

Figure 2:
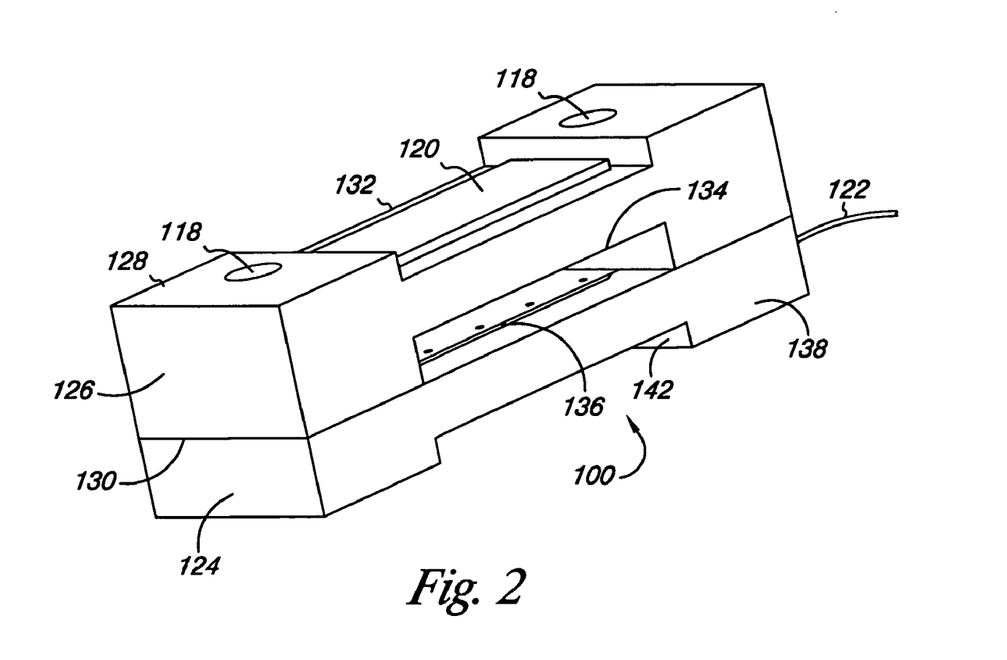
FIG. 2 is a perspective view of the present invention.
Figure 3:
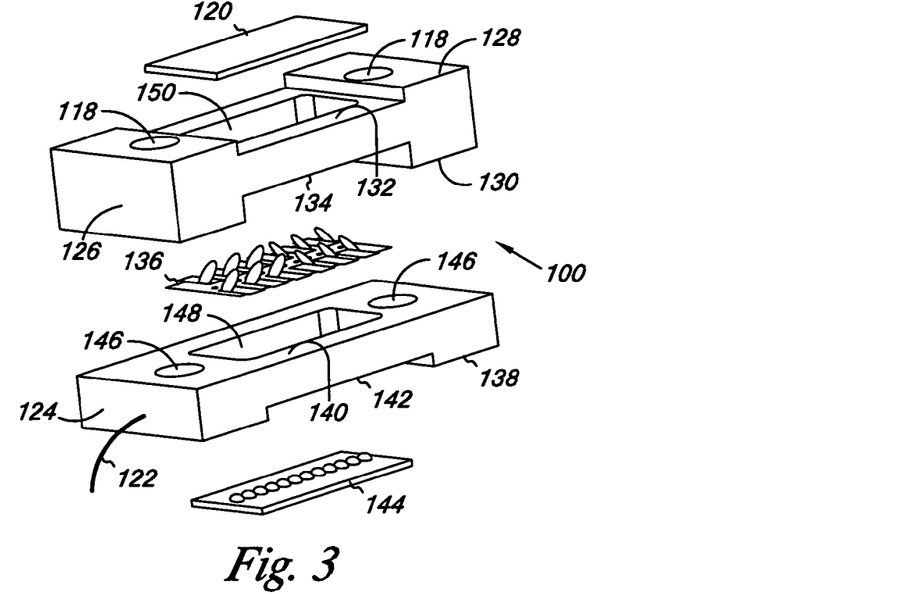
FIG. 3 is an exploded perspective view of the major components of a preferred embodiment of the in-line diagnostic tool.

As illustrated in FIGS. 1-3, the in-line fiber optic diagnostic tool 100 is generally a rectangular box dimensioned with a depth sufficient to maintain alignment upon guide pin 114 insertion. The in-line fiber optic diagnostic tool 100 is made up of two assembly structures; base structure 124 and cover structure 126 epoxied or bonded together by similar means.

Cover structure 126 is a rectangular box containing two guide holes 118 which correspond with matching guide holes 146 in base structure 124. Cover structure 126 has an MT connector face 128 and a mirror face 130. MT connector face 128 contains output lens recess 132, centered on the fiber optic ports 110 of the male MT connector 102, on which output lens array 120 is inserted. Mirror face 130 contains includes mirror assembly window 134 which is a recessed area to allow movement of the mirror assembly 136. Cover structure 126 also defines a central recess 150 for optical transmissions.

Base structure 124 serves as a platform for mirror assembly 136. Base structure 124 includes MT connector face 138 and mirror platform face 140 on opposing sides. MT connector face 138 contains an input lens array recess 142 to provide space for fiber line openings 110 and placement of input lens array 144. An electrical conductor 122 is attached to base structure 124 to provide power to mirror assembly 136.

As illustrated in the exploded view of FIG. 3, base structure 124 contains a pair of complimentary guide holes 146 for alignment with MT connector 10. In addition, base structure 124 defines a base recess 148 for the transmission of the optical signals. The individual lens structure 152 extending toward mirror assembly 136 is also shown on input lens array 144. A similar lens 154 is disposed on output lens array 120. It is envisioned that each fiber line will have a matching lens 152 and 154.

Figure 4:
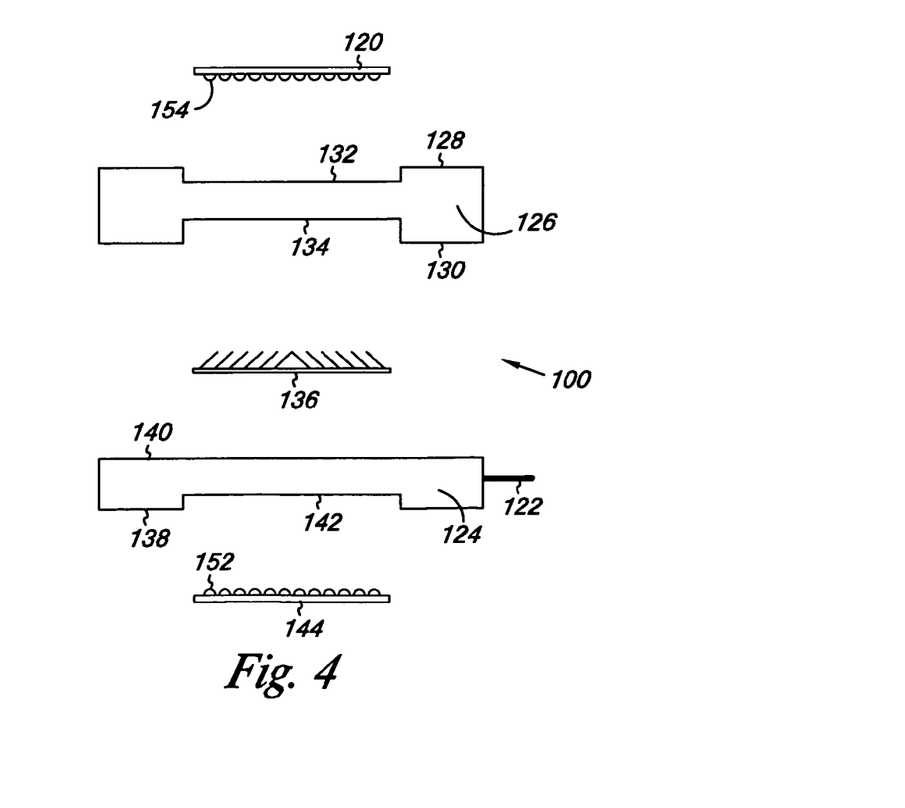
FIG. 4 is an exploded side view of the major components of a preferred embodiment of the in-line diagnostic tool.

As illustrated in FIG. 4, output lens array 120 is placed on cover structure 126 with lens 154 extending towards mirror assembly 136 through cover recess 150. Mirror assembly window 134 is sized with a depth sufficient so as not to interfere with movement of the mirror assembly 136 through their active or passive modes. Active mode is defined as at least one set of mirrors placed in the optical path of a single fiber line to perform a diagnostic check. The passive mode occurs when all of the mirrors are retracted from the optical path.

Figure 5:
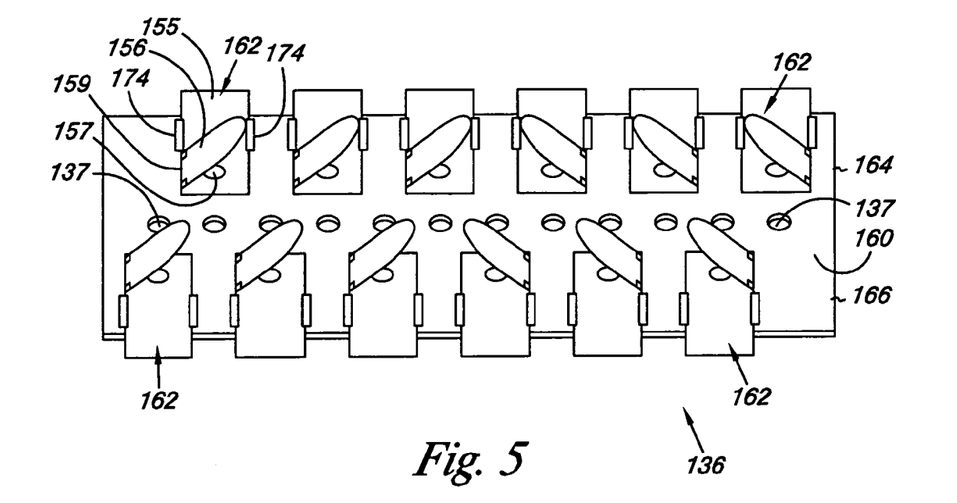
FIG. 5 is a perspective view of the mirror assembly of a preferred embodiment of the present invention with all mirror pairs in the passive mode.
Figure 6:
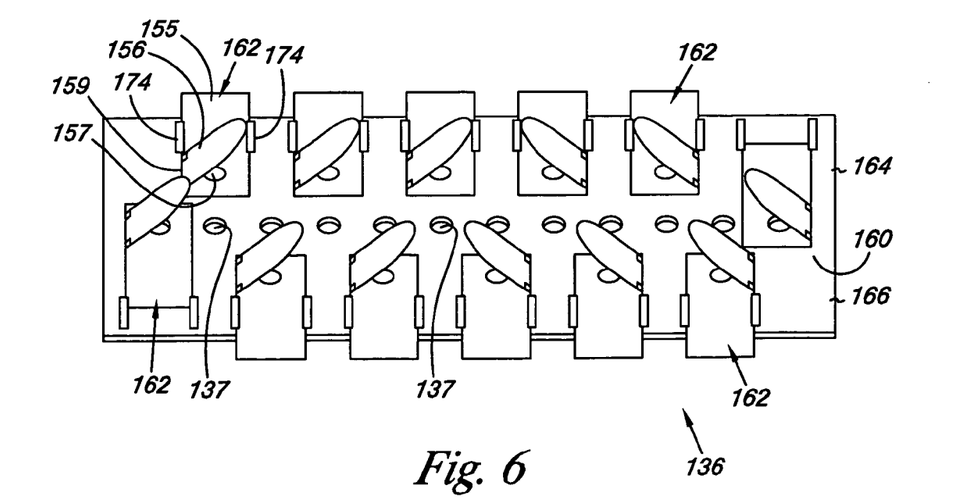
FIG. 6 is perspective view of the mirror assembly of a preferred embodiment of the present invention with the outboard mirror pairs in an active mode.

In a first embodiment, FIGS. 5 and 6 illustrate the operation of the mirror assembly 136 for a twelve-line optical communication system. Extending across mirror assembly 136 are a line of twelve assembly throughbores 137, correspondingly aligned to the twelve fiber lines 110, twelve individual output lens 154 and twelve input lens 152. In this first embodiment, each of the fiber lines 110 are matched with a mirror unit 162. In a single fiber layer layout, as illustrated in FIGS. 5 and 6, there are six mirror units 162, disposed on a first side 164 of mirror assembly 136 and six mirror units 162 on a second side 166 of mirror assembly 136.

Each mirror unit 162 has identical components. The mirror 156 is fixed at an acute angle relative to the clearance hole 157 in slide structure 155. The angle is maintained by hinge 159. It is envisioned that in alternate embodiments mirror 156 would be adjustable. Slide structure 155 defines slide throughbore 157. Mirror assembly platform 160, which is a MEMS structure, supports slide structure 155. The relative lateral position of slide structure 155 is controlled by opposing slide guides 174.

Here, a MEMS actuator may be used to move the slide structure 155 into one or multiple optical paths. It is envisioned that a first MEMS layer or ground plane provides electrical connection to the mirror assembly 136. A second layer can provide an actuating comb drive. Additional mechanical layers allow for the development of gears which are free to rotate on a hub. The third mechanical layer makes it possible to link and actuator to a tool. Other types of micro actuators may be used as well.

Figure 7:
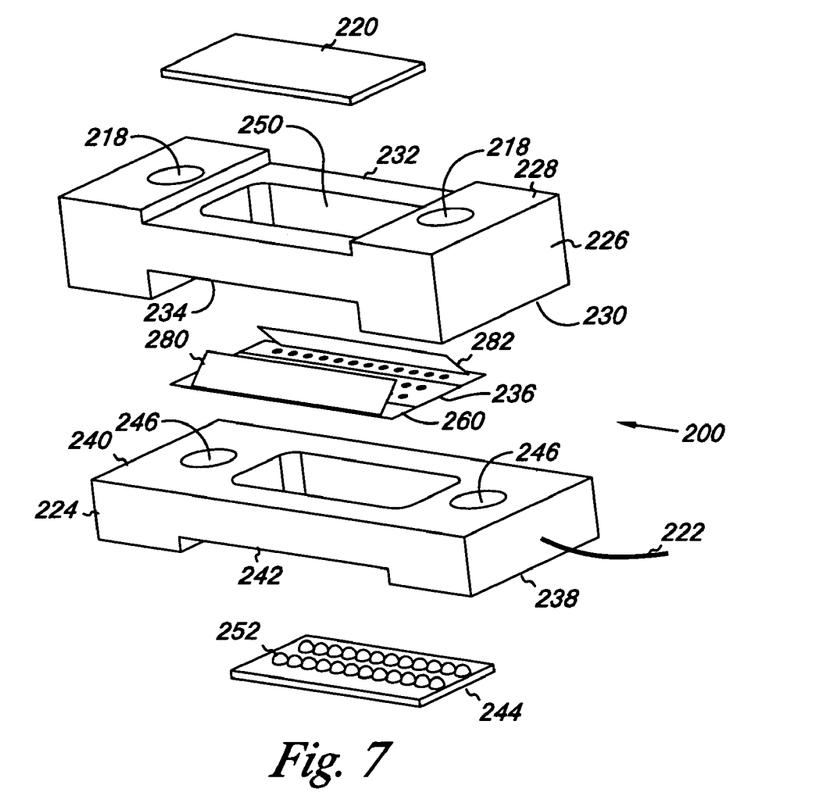
FIG. 7 is an exploded perspective view of the major components of an alternate embodiment of the present invention.
Figure 8:
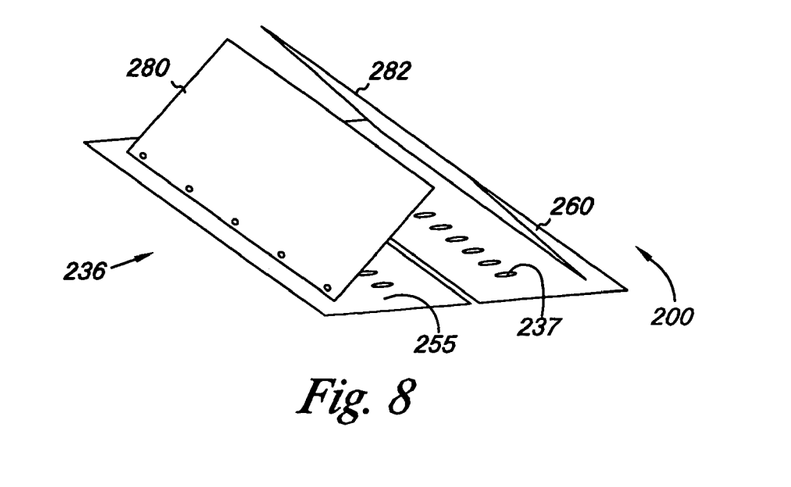
FIG. 8 is a perspective view of the alternate embodiment mirror panel assembly.

FIG. 6 illustrates the active mode of the mirror assembly 136 of in-line diagnostic tool 100. In FIG. 6, two mirror units 162 have been advanced so that the respective slide throughbores 157 are disposed over assembly throughbores 137. The angle of incidence of the respective mirrors 156 are set so as to transfer the optical signal from one fiber line 110 to the respective mirror 156 across the MEMS substrate 160 to the opposing mirror 156. To test all fiber lines, the procedure would continue with advancement of paired mirror units 162. It is envisioned that each matching pair will be retracted at the completion of the diagnostic test. Such an operation can be conducted at the initial startup of a system or at any time thereafter in order to check integrity of the optical lines and/or the optoelectronic devices. It is envisioned that many different deployment schemes, whereby one mirror unit remains in an active position while opposing mirror units advance for diagnostic purposes may be developed to perform the same level of diagnostics FIG. 7 and FIG. 8 depict an alternate embodiment of the present in-line diagnostic tool 200 for application with MT connectors carrying 24 fiber lines. Cover structure 226 is a rectangular box containing two guide holes 218 which correspond with matching guide holes 246 in base structure 224. Cover structure 226 has an MT connector face 228 and a mirror face 230. MT connector face 228 contains output lens recess 232, on which output lens array 220 is inserted. Mirror face 230 contains mirror assembly window 234 which is a recessed area to allow mirror movement. Cover structure 226 defines cover recess 250 for transmission of optical signals.

Base structure 224 serves as a platform for mirror panel assembly 236. Base structure 224 also has two faces; MT connector face 238 and mirror platform face 240. MT connector face 238 contains an input lens array recess 242 to provide space for fiber line 110 and placement of input lens array 244. An electrical conductor 222 is attached to base structure 224 to provide power and or commands to mirror panel assembly 236. In addition, base structure 224 also defines a central recess 248 for the transmission of the optical signals. The individual lens structure 252 extending toward mirror panel assembly 236 is also shown on input lens array 244. It is envisioned that each fiber line will have a matching lens.

As illustrated in FIGS. 7 and 8, mirror panel assembly 236 includes mirror panels 280 and 282 disposed on substrate 260 which is a MEMS structure. When activated, mirrors panel assembly 280 and 282 are guided toward each other by slide structure 255 so as to completely engage all active optical lines at once. Slide structure 255 defines, in this embodiment, twenty-four slide throughbores 237. The mirror panels 280 and 282 are set at fixed angles of incidence so that when activated the optical signal is transferred from one fiber optic line down a receiving fiber optic line. The mirror panels 280, 282 may include a single mirror spanning the panel or a plurality of individual mirrors mounted to the panel for intercepting and redirecting an optical signal. If additional layers of fiber lines are used, it is further envisioned that this system could be easily adapted so that one mirror panel, extending the length of the row of fiber ports would be advanced over a first line of fiber ports while the opposing mirror panel would be systematically advanced over the remaining lines of fiber ports. It is envisioned that additional rows of mirrors may be disposed on a mirror panel 280 and 282 for an alternative optical layouts (e.g. 48 lines). The MEMS based substrate 260 would be activated through electrical conductor 222 attached to base structure 224.

Figure 9:
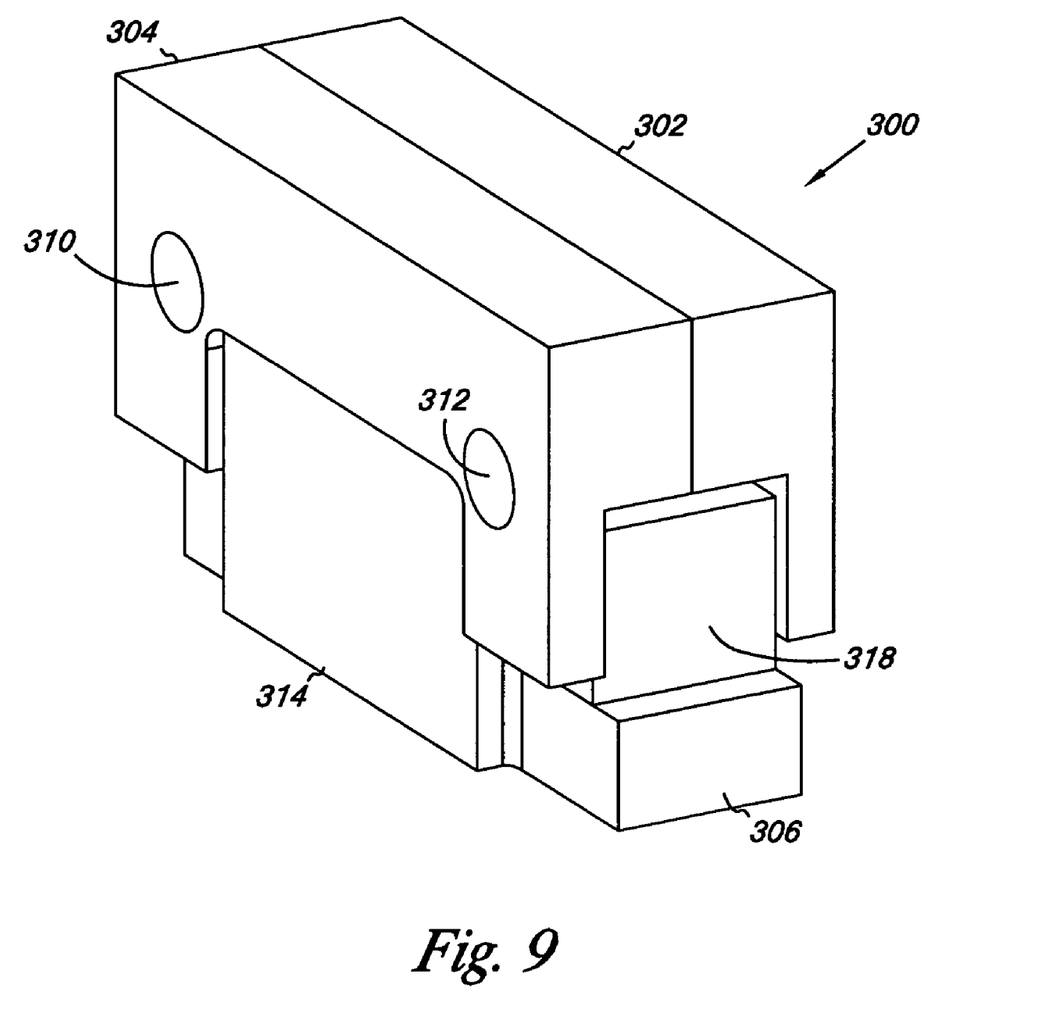
FIG. 9 is a perspective view of another alternate embodiment for the parallel placement mirrors.
Figure 10:
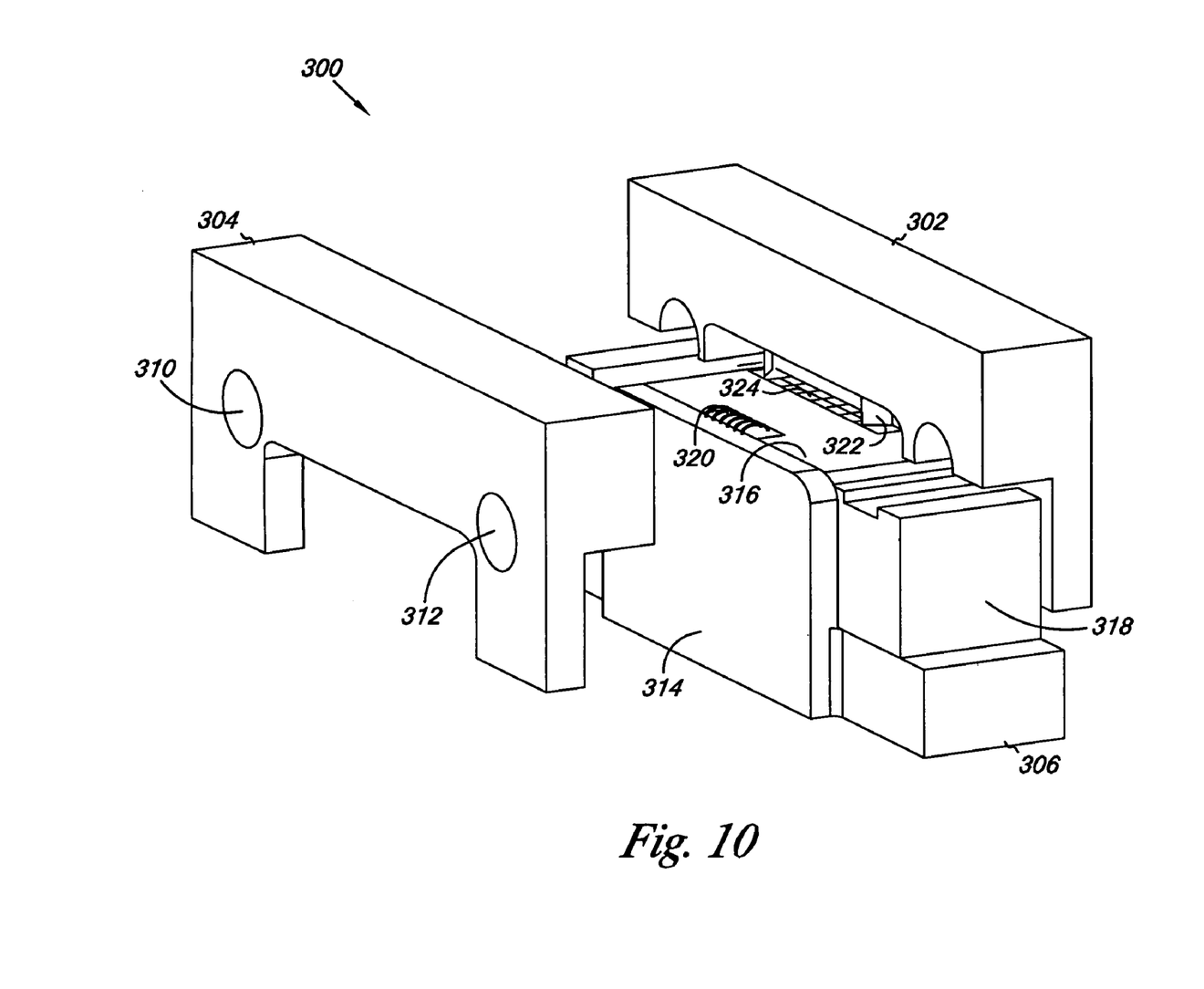
FIG. 10 is a perspective view of FIG. 9 in which the backpanel is removed.
Figure 11:
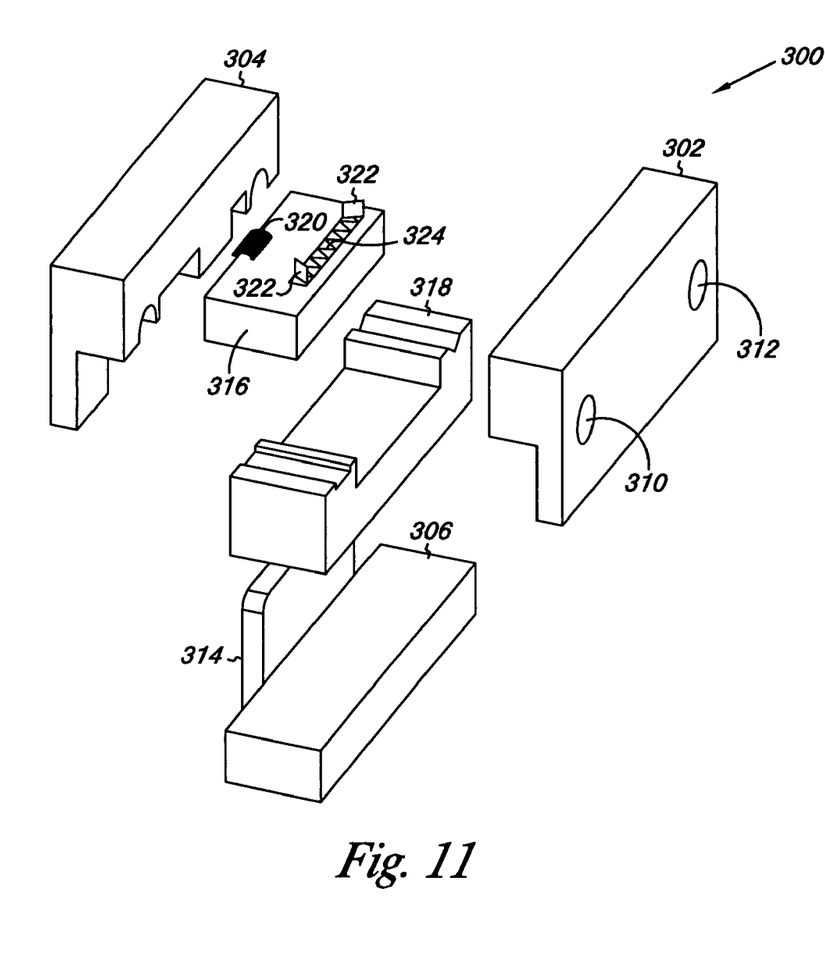
FIG. 11 is an exploded view of the alternate embodiment of FIG. 9.

FIGS. 9-11 illustrate another embodiment of the present invention wherein the MEMs substrate is disposed parallel to the light source transmission. The parallel MEMs switch 300 is comprised of a transceiver lens component 302 mated to a backpanel lens component 304 and a MEMs substrate holder 306. Transceiver lens component 302 and backpanel lens component 304 include alignment holes 310 and 312 for aligning switch 300 with an MT Connector (not shown). Transceiver lens component 302 and backpanel lens component 304 create a frame to support disposition of the I/O transition block 314 perpendicular to MEMs component 316 and MEMs substrate 318. As shown in the previous embodiments, the optical signal diagnostic tool includes a first lens array mounted on the transceiver lens component 302 and a second lens array mounted on the backpanel lens component 304 for directing an optical signal through a region of freespace inside the tool housing.

As illustrated in FIG. 10, wirebond sites 320 electrically connect I/O transition block 314 to the MEMs component 316 for control purposes. It is envisioned that voltage commands through I/O transition block 314 could activate the MEMs component required to create the diagnostic feedback loop. An electrical bus (not shown) would electrically connect the parallel MEMs switch 300 with an overall device CPU.

FIGS. 10 and 11 also illustrate one of a number of possible mirror embodiments. Mirrors 322 are shown on a MEMs rack 324, which is moved in a path perpendicular to the optical path. The fixed angle of incidence and set distance between the mirrors 322 allow for redirection of a light transmission from the transceiver to a receiver diode. Alternate MEMs mirror systems include thermally actuated pop-up mirrors, electrostatic "zippers" actuated pop-up mirrors, and nano-tractor actuated pop-up mirrors. The pop-up designs require the mirrors to be preset in the optical path of a specific transmission and receiver optical line. The rack systems have at least a pair of fixed mirrors that travel into and out of the optical path. As in the horizontal design, the mirrors create a feedback loop that reflect an optical signal from a diode or VCSEL to an optical diagnostic analyzer such as a receiver diode for diagnostics.

The invention claimed is:

1. An optical diagnostic switch for evaluating the optical condition of a fiber optic transmission system, said optical diagnostic switch comprising;
   a tool housing disposed between a male optical fiber connector and a female optical fiber connector;
   at least one mirror substrate slide structure disposed within the tool housing;
   at least one mirror substrate mounted on the at least one mirror substrate slide structure;
   at least one mirror panel assembly disposed on the at least one mirror substrate, said at least one mirror panel assembly disposed so as to advance to a position that enables the at least one mirror panel assembly to redirect an optical signal transmission through the tool housing to an optical diagnostic analyzer; and
   at least one mirror substrate defining a plurality of throughbores for the transmission of an optical signal therethrough when the at least one substrate is moved on the at least one mirror substrate slide structure into alignment with at least one optical signal.

2. The optical diagnostic switch of claim 1 wherein the tool housing defines at least one guide hole so as to align the optical diagnostic switch with the male optical fiber connector and the female optical fiber connector.

3. The optical diagnostic switch of claim 1 wherein the tool housing further includes a first lens array for directing an optical signal through a region of freespace inside the tool housing and a second lens array for directing an optical signal beyond the tool housing.

4. The optical diagnostic switch of claim 1 wherein the at least one mirror panel assembly includes a plurality of mirrors disposed so as to engage the at least one mirror substrate.

5. The optical diagnostic switch of claim 4 wherein the at least one mirror panel assembly is electrically connected to an I/O transition block for adjusting at least one mirror relative to the optical signal transmission.

6. The optical diagnostic switch of claim 5 wherein the mirrors have a fixed angle of incidence relative to a plane defined by the at least one mirror substrate.

7. The optical diagnostic switch of claim 5 wherein the at least one mirror panel assembly includes a mirror rack, said mirror rack including at least one pair of fixed mirrors that are selectively positioned relative to the optical signal transmission.

8. The optical diagnostic switch of claim 5 wherein the at least one mirror panel assembly includes least one mirror pop-up mechanism, said mirror pop-up mechanism including a mirror that selectively rotates into position relative to the optical signal.

9. The optical diagnostic switch of claim 8 wherein the mirror pop-up mechanism is comprised of one of a thermally actuated pop-up, a electro-static zipper actuated pop-up or a nano-tractor actuated pop-up.

10. The optical diagnostic switch of claim 1 wherein the at least one mirror panel assembly includes at least one mirror to direct an incoming optical signal to at least one additional mirror within the tool housing, said at least one additional mirror directing the optical signal to the optical diagnostic analyzer.

11. The optical diagnostic switch of claim 1 wherein the at least one mirror substrate includes at least one mirror with an adjustable angle of incidence relative to the plane of the throughbores.

12. The optical diagnostic switch of claim 1 wherein the at least one mirror substrate is a Micro-electro-machined system that includes at least one micro actuator for selectively advancing and retracting a plurality of mirror slides.

13. An optical diagnostic switch for evaluating the optical condition of a fiber optic transmission system, said optical diagnostic switch comprising;
   a tool housing disposed between a male optical fiber connector and a female optical fiber connector;

at least one mirror substrate slide structure disposed within the tool housing;

at least one mirror substrate mounted on the at least one mirror substrate slide structure;

at least one mirror panel assembly disposed on the at least one mirror substrate, said at least one mirror panel assembly disposed so as to advance to a position that enables the at least one mirror panel assembly to redirect an optical signal transmission through the tool housing to an optical diagnostic analyzer;

wherein the at least one mirror panel assembly includes a plurality of mirrors disposed so as to engage the at least one mirror substrate;

wherein the at least one mirror panel assembly is electrically connected to an I/O transition block for adjusting at least one mirror relative to the optical signal transmission; and wherein the at least one mirror panel assembly includes a mirror rack, said mirror rack including at least one pair of fixed mirrors that are selectively positioned relative to the optical signal transmission.

14. A method for diagnosing and evaluating an optical signal, said method comprising;

inserting a tool housing between a male optical fiber connector and a female optical fiber connector, wherein the tool housing includes at least one mirror panel assembly, said at least one mirror panel assembly including at least one mirror substrate and at least one mirror disposed so as to advance to a position that enables the at least one mirror panel assembly to intercept an optical signal transmitted through the tool housing;

selectively advancing at least one mirror on a mirror substrate slide structure from a passive position into an optical path for the optical signal;

activating a light source so as to create the optical signal, said optical signal transmitted on a first fiber optic line;

directing the optical signal to an optical diagnostic analyzer;

evaluating the optical signal;

wherein the at least one mirror substrate includes a micro-electro-machined system for selectively activating the plurality of mirrors; and wherein the at least one mirror substrate defines a plurality of throughbores for the transmission of an optical signal, said throughbores aligned to allow transmission of the optical signal through the tool housing.

15. The method of claim 14 further including directing the optical signal to a second mirror fixed to the at least one mirror substrate prior to evaluating the optical signal.

16. The method of claim 14 further including:

retracting the plurality of mirrors disposed on the at least one mirror substrate to the passive position after evaluating the optical signal.

17. The method of claim 14 wherein the mirror is disposed on a mirror slide.

18. The method of claim 14 wherein the micro-electro-machined system includes a rack for selectively advancing and retracting the plurality of mirrors.

19. The method of claim 14 wherein the micro-electro-machined system includes a pop-up mechanism for selectively rotating the plurality of mirrors.

20. An optical diagnostic switch for evaluating the condition of an optical signal of a fiber optic transmission system, said optical diagnostic switch comprising;

a tool housing disposed between a male optical fiber connector and a female optical fiber connector;

optical signal bypass means for selectively advancing a mirror including at least one mirror substrate defining a plurality of throughbores for the transmission of the optical signal therethrough when at least one substrate is moved on at least one mirror substrate slide structure into alignment with the optical signal; and diagnostic means for evaluating the optical signal received by an optical diagnostic analyzer disposed at a distal end of a receiver fiber optic line.

21. The optical diagnostic switch of claim 20 wherein optical signal bypass means may further include a plurality of mirrors to direct the optical signal from a first mirror to a receiver diode that converts the optical signal to an electrical signal.

* * * * *